UNITED STATES PATENT OFFICE.

MARY SCHNEIDER, OF ST. LOUIS, MISSOURI.

WASHING-FLUID.

SPECIFICATION forming part of Letters Patent No. 392,885, dated November 13, 1888.

Application filed February 29, 1888. Serial No. 265,691. (Specimens.)

*To all whom it may concern:*

Be it known that I, MARY SCHNEIDER, a citizen of the United States, residing at the city of St. Louis, in the State of Missouri, have invented a new and useful Composition of Matter for Laundry Use in Washing Clothes, of which the following is a specification.

My composition consists of the following ingredients, combined in the proportions stated, viz: one gallon of water, two ounces *Anthemis nobilis*, (camomile-flowers,) one-half ounce *Zingiber officinale*, (ginger-root,) and two ounces aqua ammonia.

The ingredients above set forth are boiled together until the strength is extracted from the root and flowers therein, and the fluid upon being strained off constitutes the washing-fluid.

My composition is used in the following manner: The clothes to be washed are, after being soaked in cold water, wrung half-dry, soaped all over with ordinary washing-soap, and are then boiled in water containing one-half tea-spoonful of this compound to each four gallons of water.

The advantages of my composition are that by its use all dirt stains and discolorations are removed from the clothes without the use of a wash-board or rubbing or scouring of any kind.

What I claim, and desire to secure by Letters Patent, is—

The herein-described composition of matter, consisting of water, extract of *Anthemis nobilis*, (camomile-flowers,) extract of *Zingiber officinale*, (ginger-root,) and aqua-ammonia, in the proportions and for the purposes herein specified.

MARY SCHNEIDER.

Witnesses:
 J. C. H. STEVENSON,
 T. S. STUMPS.